June 6, 1950 E. E. VAN HAM 2,510,729
LIQUID LEVEL INDICATING GAUGE
Filed March 26, 1947
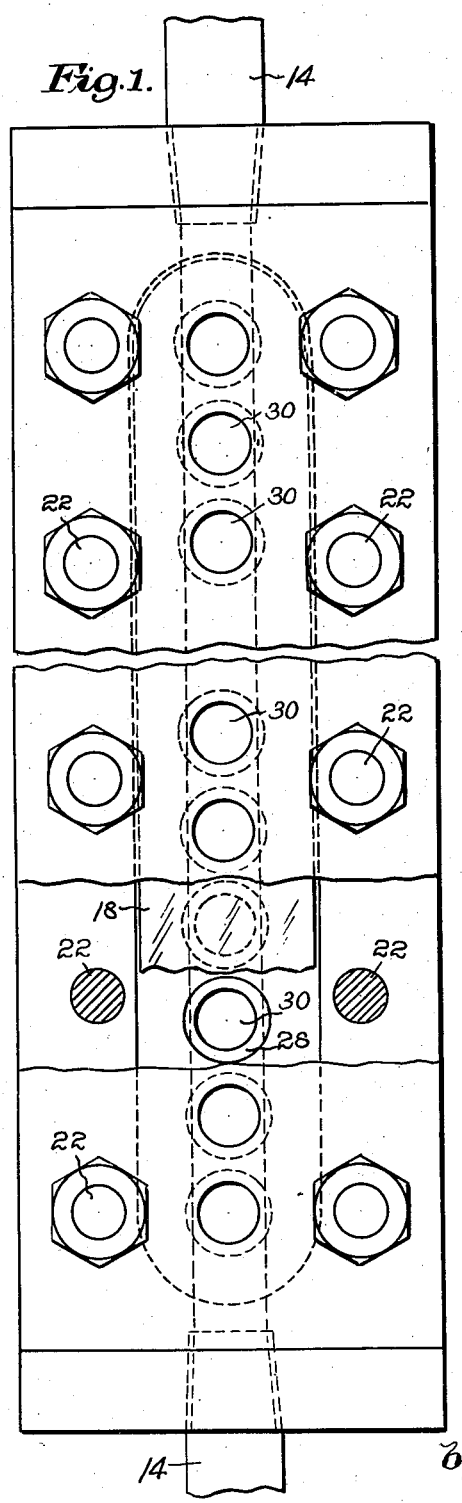
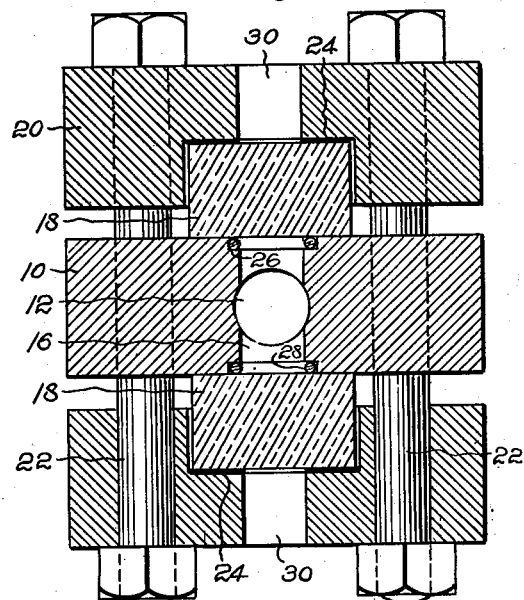
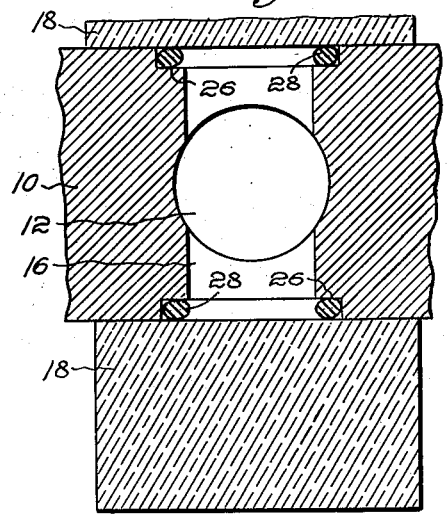
Inventor:
Ernest E. Van Ham
by Emery, Booth, Townsend, Miller & Neudner
Attys Patented June 6, 1950

2,510,729

UNITED STATES PATENT OFFICE 2,510,729

LIQUID LEVEL INDICATING GAUGE

Ernest E. van Ham, Somerville, Mass., assignor to Jerguson Gage & Valve Company, Somerville, Mass., a corporation of Massachusetts Application March 26, 1947, Serial No. 737,220

5 Claims. (Cl. 73—330)

This invention relates to gages of the type used on boilers and other liquid containers to indicate the liquid level therein. The object is to provide a simple and effective device of this type adapted to be used with high pressures.

The gage familiar to everyone and commonly referred to as a gage glass is a simple cylindrical glass tube. This may be used for low pressures such as those of a boiler for domestic heating. It is not adapted, however, for high pressures and it has been customary to provide gages consisting of a heavy body of steel provided with a groove or slot which receives the liquid column and is closed on one or both sides, as the case may be, with a flat plate or plates of heavy glass secured by a frame or frames bolted in position. The pressures of various installations with which it is desirable to use such a gage, however, are frequently such that these constructions are unsatisfactory because of the limitations in the strength of the body itself as well as that of the glass and the difficulty in maintaining a tightly sealed joint between the glass and gage body. The construction of the present invention overcomes these difficulties in a simple and inexpensive manner.

My invention will be well understood by reference to the following description taken in connection with the accompanying drawings of an illustrative embodiment of the invention, wherein:

Fig. 1 is a front elevation of the gage with its central part broken away and portions successively broken out;

Fig. 2 is a transverse section; and

Fig. 3 is an enlarged view of a portion of Fig. 2.

Referring now to the drawing, the gage there shown comprises a bar-like body 10 which is provided with a longitudinal bore 12 to the ends of which may be connected the pipes or conduits 14 (Fig. 1) communicating with the two sources of pressure the differential of which it is desired to indicate, as, for example, the water-containing space and the steam-containing space of a high pressure boiler. The body is pierced with transverse bores 16 intersecting the central bore 12 at a multiplicity of points so that the water level in the bore may be observed through one of these bores substantially continuously along the length of the vertical bore. Herein these transverse bores are arranged in a single vertical aligned row although this is not necessary. The gage here shown may be read from either side so the bores 16 extend completely through the body opening to either face of the same as seen in Fig. 2.

Overlying each face of the body and covering a plurality of the bores, herein the entire series, is a flat glass 18 of the type hitherto used, which is secured against the face of the body 10 by a frame member 20 secured by bolts 22, the usual cushion 24 being interposed between the frame and the outer face of the glass 18. As best seen in Fig. 3, at the ends of each transverse bore 16 the face of body 10 is provided with grooves 26 surrounding the ends of the bore and individual annular packings 28 are positioned in the grooves for sealing the spaces at the ends of the bores between the outer face of the body 10 and the inner face of the glass 18. Certain packings commercially available for use in sealing a joint between two cylindrical members, one of which is received within the other in the manner of a bell and spigot joint and which are formed of a rubber composition, are suitable.

Where the bore 16 is circular, the packings 28 in their normal unstressed condition may take the form of a circular annulus conveniently circular in cross section. The grooves 26 may then take the form of rabbets of angular cross section, being in effect terminal enlargements of the bores, designed loosely to receive the packing rings 28, which may be merely dropped into position, no special retaining or positioning means being required along their internal circumference. The entire internal semi-circumference of the cross section of the rings is then exposed directly to pressure fluid from the bore to thrust the ring axially of the bore and radially outward to seal the space between the face of the body 10 and the glass 18. The rings 28 are of such dimension in cross section as to project slightly beyond the groove or rabbet 26 for a distance only a fraction of their cross-sectional diameter. Thus in practice where the rabbet is nominally an eighth of an inch deep, the projection may be about .015 of an inch and the packing rings are thus slightly compressed, as shown in Fig. 3, when the glass is in position and secured by the frame 20. It is important to note, however, that with this construction an effective joint is obtained without excessive pressure exerted on and through the glass, it being necessary to set up the bolts 22 only finger tight to secure effective sealing of the joint even against enormous internal pressures.

I have referred to the member 20 as a frame. Conveniently, and to contribute to its strength, it may be a bar provided with separate sight openings 30 as distinguished from a longitudinal slot substantially coextensive with the height of the gage, each of the sight openings disclosing at most a few of the transverse bores 16, there being herein shown single openings which in use are aligned with the individual bores 16.

By virtue of the construction the body 10 is strongly reinforced by the webs binding together the two sides between the locations of the transverse bores 16. The packing is effective and the pressure on the glass much diminished so that breakage of the glass under excessive pressure is avoided.

I am aware that it has been proposed to provide gage glasses with a vertical series of sight openings, each provided with its own glazing and glass-securing bezel, being in effect what are called bull's-eyes, and this I do not claim. The construction is also to be distinguished from one in which a packing provided with a plurality of openings and generally similar in form to the cylinder head gasket of an automobile engine would be interposed between a glass and a plurality of bores similar to the bores 16.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A gage of the type described suitable for high pressure comprising a bar-like body having a longitudinal bore for communication at each end with sources of pressure the differential between which is to be indicated, there being a multiplicity of transverse bores opening from a face of the body to the longitudinal bore along the length of the latter, a glass overlying said face and covering a plurality of the bores, a frame retaining the glass against said face, and individual annular packings surrounding each transverse bore sealing the space at the end of the bore between the outer face of the body and the inner face of the glass.

2. A gage of the type described suitable for high pressure comprising a bar-like body having a longitudinal bore for communication at each end with sources of pressure the differential between which is to be indicated, there being a multiplicity of transverse bores opening from a face of the body to the longitudinal bore along the length of the latter, a glass overlying said face and covering a plurality of the bores, a frame retaining the glass against said face, and individual annular packings surrounding each transverse bore sealing the space at the end of the bore between the outer face of the body and the inner face of the glass, the frame having a number of sight openings, each disclosing a submultiple only of the transverse bores covered by the glass secured thereby.

3. A gage of the type described suitable for high pressure comprising a bar-like body having a longitudinal bore for communication at each end with sources of pressure the differential between which is to be indicated, there being a multiplicity of transverse bores opening from a face of the body to the longitudinal bore along the length of the latter, the face of the body at the end of the bores having grooves surrounding the bores, a glass overlying said face and covering a plurality of the bores, a frame retaining the glass against said face, and individual annular packings for each transverse bore loosely received in said grooves to be pressed into the space at the ends of the bores between the outer face of the body and the inner face of the glass.

4. A gage as defined in claim 3 wherein the grooves are open-sided angular rabbets constituting enlargements of the ends of the bores.

5. A gage of the type described suitable for high pressure comprising a bar-like body having a longitudinal bore for communication at each end with sources of pressure the differential between which is to be indicated, there being a multiplicity of transverse bores opening from a face of the body to the longitudinal bore along the length of the latter, the face of the body at the end of the bores having grooves surrounding the bores, a glass overlying said face and covering a plurality of the bores, a frame retaining the glass against said face, and individual annular packings for each transverse bore, each having a cross section substantially different from the groove which receives it and, when uncompressed, a dimension axial to the annulus exceeding the axial depth of the rabbet by a small fraction of said dimension whereby it is only lightly compressed by the glass.

ERNEST E. van HAM.

REFERENCES CITED

The following references are of record in the file of this patent:

UNITED STATES PATENTS

| Number | Name | Date |
|---|---|---|
| 809,471 | Seabury | Jan. 9, 1906 |
| 1,703,426 | Kerr | Feb. 26, 1929 |
| 1,947,910 | Jerguson | Feb. 20, 1934 |
| 2,201,542 | Kinderman | May 21, 1940 |